United States Patent [19]

Augendre et al.

[11] Patent Number: 4,712,425
[45] Date of Patent: Dec. 15, 1987

[54] WHEEL BALANCING MACHINE, PARTICULARLY FOR AUTOMOBILE WHEELS

[75] Inventors: Claude Augendre, Dreux; Jean-Loup Rapidel, Paris; Jacques Hennes, Ezy-sur-Eure, all of France

[73] Assignee: Facom, Morangis, France

[21] Appl. No.: 906,076

[22] Filed: Sep. 11, 1986

[30] Foreign Application Priority Data

Sep. 12, 1985 [FR] France ................................ 85 13555

[51] Int. Cl.$^4$ ............................................. G01M 1/02
[52] U.S. Cl. ...................................... 73/460; 73/462
[58] Field of Search ................. 73/460, 462, 475, 476, 73/477, 478, 479, 487

[56] References Cited

U.S. PATENT DOCUMENTS

| | | | |
|---|---|---|---|
| 3,781,532 | 12/1973 | Dorsman et al. | 73/462 |
| 4,223,386 | 9/1980 | Maruyama et al. | 73/462 |
| 4,635,481 | 1/1987 | Curchod | 73/462 |

FOREIGN PATENT DOCUMENTS 2323139 4/1977 France .
2123159 1/1984 United Kingdom .

*Primary Examiner*—John Chapman
*Attorney, Agent, or Firm*—Wenderoth, Lind & Ponack

[57] ABSTRACT

The balancing machine comprises a shaft (2) mounted on a frame (1) by means of two bearings (3, 4), under each of which a force sensor (5, 6) is mounted. The shaft (2) is driven by a motor (10) and a chain transmission. The chain (16) of this transmission has a pulling side which is taut and at right angles to the plane passing through the axes of sensitivity of the sensors (5, 6), while its driven side is slack.

2 Claims, 2 Drawing Figures

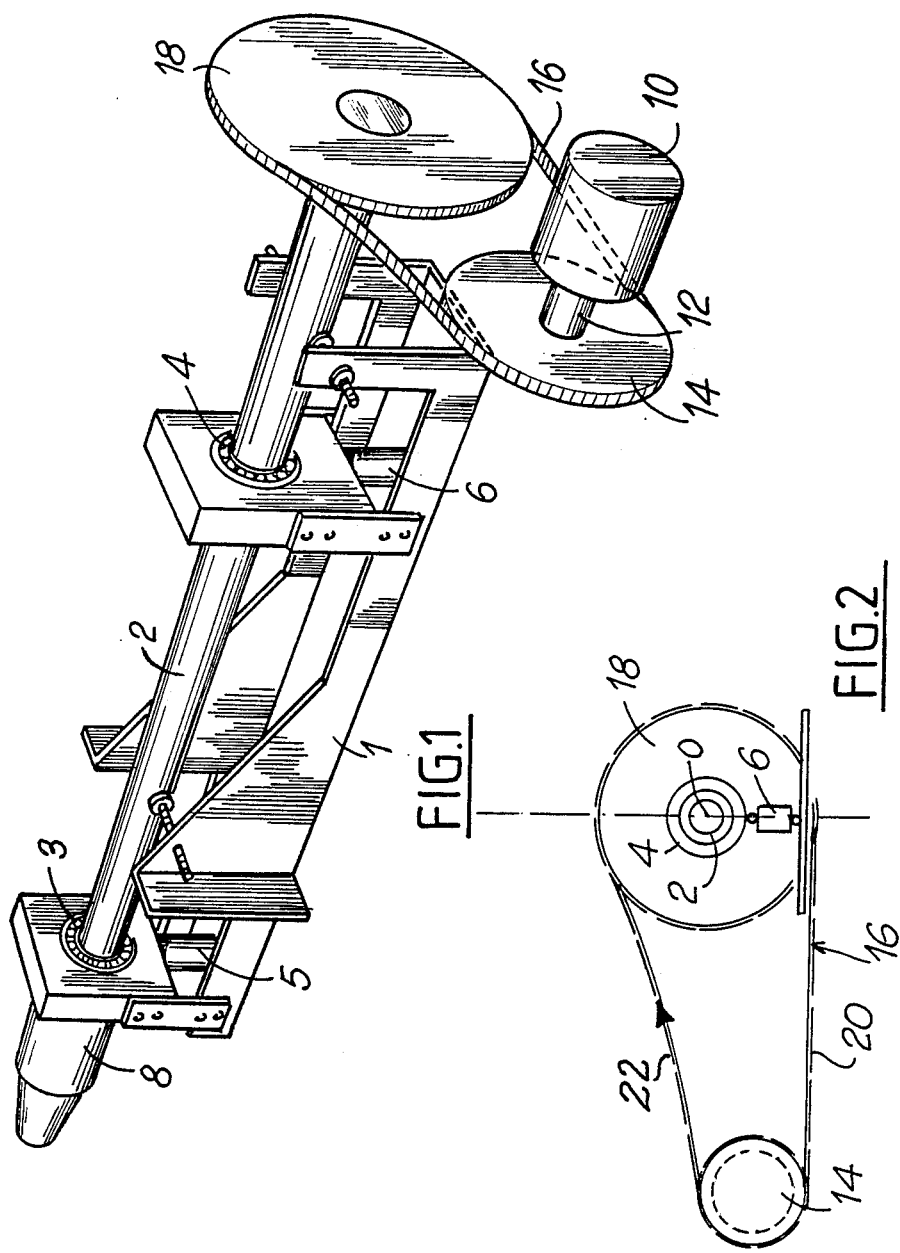

WHEEL BALANCING MACHINE, PARTICULARLY FOR AUTOMOBILE WHEELS

The present invention relates to a balancing machine for vehicle wheels, which comprises a shaft mounted on a frame by means of two bearings, each provided with a force sensor and driven rotationally by means of a motor enabling it to attain a sufficient speed for the balancing of a wheel fixed on it.

In balancing machines of this type the motor is generally connected to the shaft by a belt and pulley transmission, which enables the belt to engage with a driven pulley of large diameter and thus to be in contact with it over a large angle. In this way the parasitic variations of the speed of the shaft are relatively slight. Nevertheless, although the sensors are placed at right angles to the force produced by the belt tension, it is found that the irregularities of shape of the belt and pulleys produce in the force sensors very strong parasitic signals, which are often of the same order of magnitude as the measurements which it is required to make.

Furthermore, a belt and pulley transmission permits only a low reduction ratio, since a high ratio requires pulley dimensions which are too great for a size of balancing machine compatible with practical use. The balancing machine must therefore have an engine whose speed of rotation is relatively low and whose power is consequently high.

It has been proposed to replace the belt transmission with a pinion and gear drive in order to make it possible to obtain a higher reduction ratio, but this arrangement failed because the pinion and gear are in engagement only by one tooth and consequently there is considerable oscillation of the speed of rotation when the engagement passes from one tooth to another.

The present invention seeks to provide a balancing machine comprising a transmission permitting not only a high reduction ratio but also a drive with no oscillation of the shaft.

This invention relates in fact to a balancing machine of the type defined above, which comprises a chain transmission in which the chain, which passes over sprockets fastened respectively to the wheel support shaft and the engine output shaft, comprises a taut pulling side, which is at right angles to the plane passing through the sensitivity axes of the force sensors, and a pulled side which is slack.

As the result of this arrangement, the transmission chain transmits to the shaft none of the lateral forces capable of producing parasitic signals.

The description below of one embodiment, given as a non-limitative example and illustrated in the accompanying drawing, will moreover make clear the advantages and characteristics of the invention.

In this drawing,

FIG. 1 is a view in perspective of a balancing machine according to the invention, and FIG. 2 is a schematic view of the transmission used in the balancing machine shown in FIG. 1.

The wheel balancing machine shown comprises in conventional manner a frame 1 which carries a shaft 2 by means of two bearings 3 and 4. Under each of the bearings 3 and 4 is mounted a force sensor 5 and 6 respectively, which is connected to a measuring and display device (not shown).

At one end the shaft 2 is provided at 8 with a support means for the wheel to be balanced, while at its other end it is connected to a drive motor 10.

The drive motor 10 carries on its output shaft 12 a sprocket 14 over which passes a chain 16 driving a second sprocket 18 fastened to the shaft 2. The ratio between the number of teeth on the wheels 14 and 18 is selected in accordance with the reduction ratio desired for the transmission.

As is shown more particularly in FIG. 2, the pulling side 20 of the chain 16 is taut and is at right angles to the plane passing through the axes of sensitivity of the two force sensors 5 and 6. However, the driven side 22 of said chain 16 is flexible and slack.

As the result of this arrangement, the driven side 22 applies practically no force to the driven sprocket 18, which has to support only its own weight. The chain 16 consequently transmits only a torque to the shaft 2; the lateral forces which could produce parasitic signals are absorbed by the slack of the side 22 and are not transmitted either to the sprocket 18 or, therefore, to the shaft 2.

On the other hand, the chain 16 is in contact with the sprocket 18 over a large angle, while the ratio between the teeth of the sprockets 14 and 18 can be high without giving the balancing machine unacceptable dimensions.

The balancing machine thus makes it possible to obtain an accurate measurement solely of the forces due to the unbalance of the wheel being balanced.

What is claimed is:

1. A wheel balancing machine, particularly for automobile vehicle wheels, comprising a shaft which is mounted in two bearings, each provided with a force sensor, and is driven rotationally by means of a transmission and a motor, wherein the transmission is a chain transmission comprising a chain whose pulling side is taut and is at right angles to the plane passing through the axes of sensitivity of the force sensors, while its driven side is slack.

2. A balancing machine as claimed in claim 1, wherein the driven side is sufficiently slack to exert practically no force on a driven sprocket.

* * * * *